United States Patent

Gizara et al.

[19]

[11] Patent Number: 6,075,845
[45] Date of Patent: Jun. 13, 2000

[54] SYSTEM AND METHOD FOR PERFORMING TELEPHONE LINE-IN-USE DETECTION, EXTENSION PICK-UP DETECTION, AND REMOTE HANG-UP DETECTION IN A MODEM

[75] Inventors: Andrew R. Gizara, Lake Forest; Robert W. Frankland, Laguna Hills, both of Calif.

[73] Assignee: Conexant Systems, Inc., Newport Beach, Calif.

[21] Appl. No.: 09/224,762

[22] Filed: Jan. 4, 1999

Related U.S. Application Data

[63] Continuation-in-part of application No. 09/136,789, Aug. 19, 1998, which is a continuation-in-part of application No. 09/096,851, Jun. 11, 1998.

[51] Int. Cl.[7] .................................................. H04M 11/00
[52] U.S. Cl. ..................................... 379/93.08; 379/93.07
[58] Field of Search ................. 379/93.01, 93.05–93.11, 379/93.28, 93.34, 93.37, 100.06, 100.12, 100.15, 100.16, 377, 381–383

[56] References Cited

U.S. PATENT DOCUMENTS

| | | | |
|---|---|---|---|
| H1175 | 4/1993 | Giorgio | 379/93.28 |
| 5,506,891 | 4/1996 | Brown | 379/100.16 |
| 5,535,265 | 7/1996 | Suwandhaputra | 379/93.28 |
| 5,841,840 | 11/1998 | Smith et al. | 379/93.07 |

OTHER PUBLICATIONS

Computer Dictionary by Microsoft Press, 2nd edition, copyright 1994, pp. 162, 265.

*Primary Examiner*—Wing F. Chan
*Attorney, Agent, or Firm*—Akin, Gump, Strauss, Hauer & Feld, L.L.P.

[57] ABSTRACT

The invention is directed to multi-line data exchange systems. The invention comprises one or more telephony devices, each coupled to one or more telephone communication lines, such as a standard telephone line, T1 line, T3 line, coaxial cable, or fiber optic line. The telephony devices are equipped with data communication interfaces. These interfaces allow the telephony devices to operate on more than one telephone communication line. The telephone communication lines operate on several bandwidths, including an audio bandwidth. The telephony devices can communicate among themselves apart from the audio bandwidth of the telephone communication lines. When another telephony device is activated or ceases use on one of the telephone communication lines, the telephony devices detect this event and communicate information on the usage of the telephone communication line on the telephone communication lines at a bandwidth other than the audio bandwidth used in voice communications.

10 Claims, 15 Drawing Sheets

SYSTEM AND METHOD FOR PERFORMING TELEPHONE LINE-IN-USE DETECTION, EXTENSION PICK-UP DETECTION, AND REMOTE HANG-UP DETECTION IN A MODEM

CROSS REFERENCES TO RELATED CASES

The present case is a continuation in part of U.S. application Ser. No. 09/136,789, filed Aug. 19, 1998, pending, which is based a continuation in part of U.S. application Ser. No. 09/096,851, filed Jun. 11, 1998, all of which are hereby incorporated herein by reference in their entirety.

SPECIFICATION

BACKGROUND

1. Field of Invention

The present invention relates generally to a modem having detection circuitry for particular telephone communication line events, and specifically to a system and method for detecting telephone line-in-use, extension pick-up, and remote hang-up in a modem.

2. Background of the Invention

Modem communication over telephone communication lines has gained widespread usage with the growing number of multi-media applications implemented using personal computers. Personal computers (PCs) now perform many different types of data transfers over telephone communication lines, such as accessing the "Internet," communicating data files between PCs, sending and receiving facsimiles, and acting as an answering machine by sending and receiving voice information over the telephone communication lines. Modems are used to convert between a computer's digital signals and analog signals that can be carried on the telephone network's analog transmission lines.

In using a conventional modem to interface a telephone communication line for such data transfers, there are several telephone communication line conditions that can adversely affect the performance of the modem and/or the telephone connection. For instance, in households having multiple telephone extensions connected to a single telephone communication line, it is possible for a person to try to establish a modem connection with the telephone communication line while another person in the household is already talking over the telephone communication line using another telephone extension. If the telephone communication line is already in use, the person on the telephone will hear annoying "popping" sounds generated by the modem trying to go off-hook in order to dial out. Moreover, most modems are configured to repeatedly reattempt to seek a dial tone to thereby enter the off-hook mode after failed previous attempts. This results in the annoying "popping" sounds being periodically heard by the persons speaking on the telephone while the modem attempts to dial out.

When a conventional modem is used in connection with performing answering machine functions, several difficulties may arise. Once the modem receives an incoming telephone call and enters an answering machine mode, such as commencing with its outgoing message or recording an incoming message, it is possible for a person to pick-up the telephone extension during the progression of the answering machine mode. This may often occur when a person hears an incoming phone call but is not able to pick-up the telephone extension until after the modem has already initiated the answering machine mode.

Most conventional modems communicate by negotiating commands between the calling and receiving modems. Once the calling modem has completed its transmission, the calling modem typically sends a command to the receiving modem indicating that the transmission is complete. The receiving modem then knows to go on-hook (hang-up). However, when receiving voice information while operating in an answering machine mode, modems will not receive such commands over the telephone communication line indicating that the voice message has been completed.

Additionally, the advent of multi-line modems has increased the problems associated with dual use of a telephone communication line. A single computing device may employ a multi-line modem, or a number of single line modems working in parallel, to increase the bandwidth of a connection, to negotiate parallel communications with multiple partners, or both. When another telephony device attached to a telephone communication line that the multi-line computing device is using goes off hook, a user must manually disable the connection on that telephone communication line to allow the use of the other connected telephony device. Additionally, when the telephony device connected to such a telephone communication line goes on hook and frees up a telephone communication line, the user also must enable the telephone communication line to the computing device manually.

SUMMARY OF THE INVENTION

The present invention is directed towards a data exchange system for transferring data by a number of telephone communication lines. The data exchange system is made up of telephony devices with interfaces to receive signals from one or more of the telephone communication lines. The telephone communication lines have multiple bandwidths for passing information, including a bandwidth for normal audio communications. The telephony devices may pass data among themselves through the audio bandwidth or any of the other bandwidths available on the telephone communication lines. At least one of the telephony devices communicates information regarding usage of the telephone communication lines at a bandwidth other than the audio bandwidth, or the bandwidth used in any modulated communications between the devices.

The telephony devices may have a data communication device having an extension pick up detection circuit. The data communication device may also have a line in-use detection circuit, or a remote line hang-up detection circuit to aid in the overall communication of the data devices with themselves or other data devices accessible through the telephone network.

In addition, at least one of the telephony devices can communicate information regarding the use of the telephone communication lines in response to the activation of a telephony device.

The features of the present invention, which are believed to be novel, are set forth with particularity in the appended claims. Other aspects of the present invention will become apparent with further reference to the drawings and specification.

BRIEF DESCRIPTION OF THE DRAWINGS

The present invention, both as to its organization and manner of operation, together with further advantages, may best be understood by reference to the following description, taken in connection with the accompanying drawings in which the reference numerals designate like parts throughout the figures thereof and wherein:

FIG. 10b is a block diagram illustrating an exemplary multi-line communication system as shown in FIG. 10a;

DETAILED DESCRIPTION OF THE INVENTION

Figure 1A:
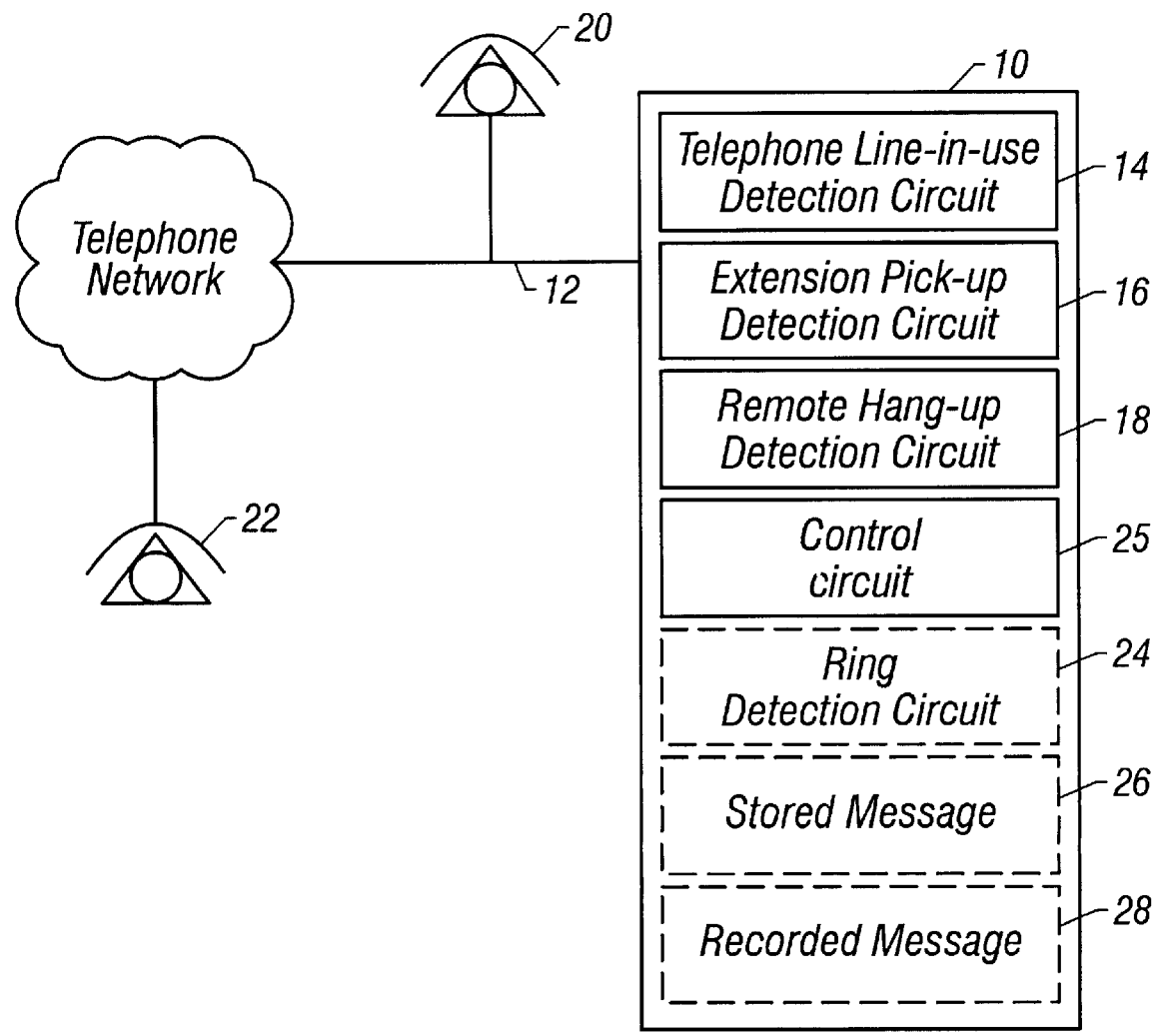
FIG. 1a is a block diagram of the system of the present invention allowing telephone line-in-use, extension pick-up, and remote hang-up events on a telephone communication line to be detected.

FIG. 1a is a block diagram of the system of the present invention allowing telephone line-in-use, extension pick-up, and remote hang-up events on a telephone communication line to be detected. A local communications device 10 contains a telephone line-in-use detection circuit 14, an extension pick-up detection circuit 16, and a remote hang-up detection circuit 18. The telephone line-in-use detection circuit 14 detects another local communications device, such as telephone 20, using a telephone communication line 12. The extension pick-up detection circuit 16 detects another local communications device, such as telephone 20, going off-hook (i.e., was picked up by a person). The remote hang-up detection circuit 18 detects when a communications device on the remote end of the telephone communication line 12, such as telephone 22, has gone on-hook (i.e., hung-up).

The local communications device 10 may also contain a ring detect circuit 24, a stored message 26, and a recorded message 28. The local communications device 10 also contains a control circuit 25, in order to coordinate the various detection circuits and the operability of the local device 10. The functionality of the local communications device 10 may be best understood with reference to FIGS. 1b–1d.

Figure 1B:
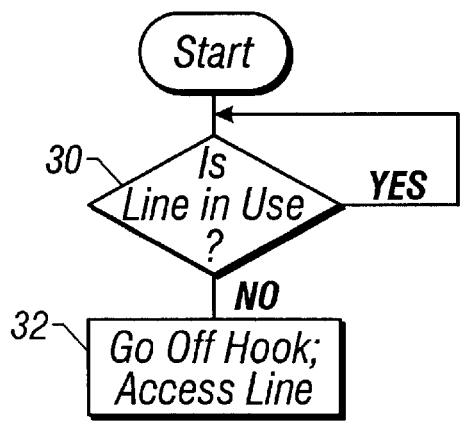
FIG. 1b is a flow diagram showing the operation of the communications device of FIG. 1a employing a telephone line-in-use circuit when attempting to access the telephone communication line.

FIG. 1b is a flow diagram showing the operation of the communications device of FIG. 1a employing a telephone line-in-use circuit when attempting to access the telephone communication line. When the local communications device 10 wishes to access the telephone communication line, it would first test whether any other communications devices, such as another telephone, are currently using the telephone communication line with the line-in-use detection circuit, shown in a block 30. If the telephone communication line is in use, then the local communications device would simply cycle back and test again. If the telephone communication line is not in use, the local communications device would go off-hook to access the telephone communication line in a block 32.

Figure 1C:
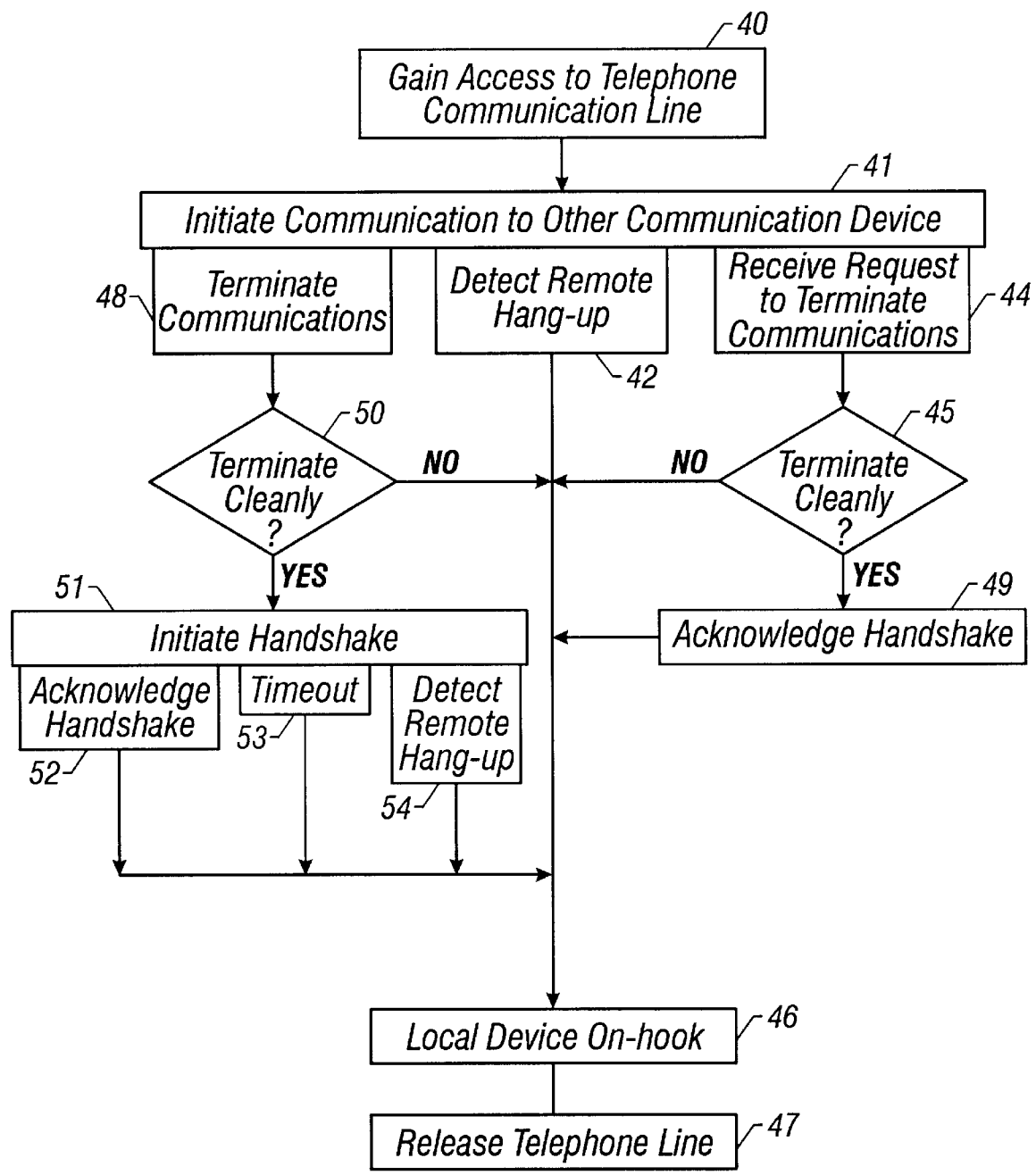
FIG. 1c is a flow diagram showing the use of the communications device of FIG. 1a when the communications device is in contact with another communications device and subsequently terminates the connection with the other communications device.

FIG. 1c is a flow diagram showing the use of the communications device of FIG. 1a when the communications device is in contact with another communications device and subsequently terminates the connection with the other communications device. In a block 40, the local communications device gains access to the telephone communication line and initiates a communications session to another communications device in a block 41.

An event block 42 signifies that the other communications device has terminated the connection without initiating any handshaking. The local communications device detects this event when through the remote hang-up detection circuit. The local communications device then goes on hook in a block 46, and releases the telephone communication line in a block 47.

An event block 44 signifies that the other local communications device wishes to terminate the session via a handshake. In a block 45, the local communications device decides whether to terminate cleanly or not. If the local communications device decides to terminate cleanly, the local communication device responds to the handshake request in a block 49. The local communications device then goes on hook in the block 46, and releases the telephone communication line in the block 47.

In an event block 48, the local communications device decides to terminate communications with the other communications device. In a block 50, the local communications device decides whether to terminate in a "clean" way or not.

If the session is to be terminated cleanly, the local communications device initiates a handshake with the other communications device, signifying that it will terminate the connection in a block 51. In an event block 52, the other communications device acknowledges the handshake. The local communications device then goes on hook in the block 46, and releases the telephone communication line in the block 47.

In an event block 53, the local communications device times out waiting for the other communications device to respond to the handshake termination. The local communications device then goes on hook in the block 46, and releases the telephone communication line in the block 47.

In an event block 54, the local communications device detects the other communications device hanging up. The local communications device then goes on hook in the block 46, and releases the telephone communication line in the block 47.

If the local communications device chooses to not terminate cleanly, the local communication device goes on hook in the block 46, and releases the telephone communication line in the block 47 without initiating any handshake. It should be noted that the other communication device's response to this would be the same response found in the event block 42, signifying a detection of a remote hang-up.

Figure 1D:
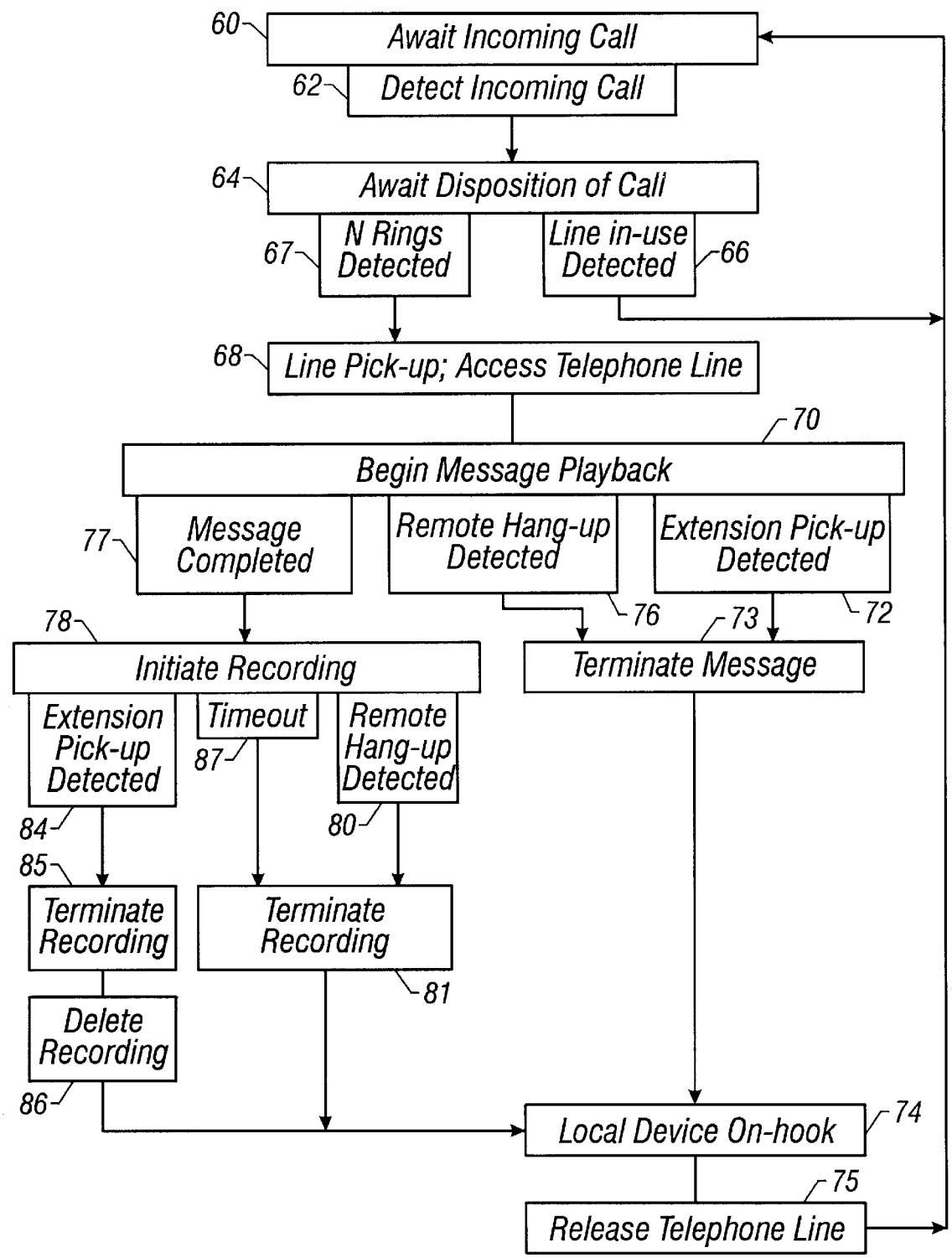
FIG. 1d is a flow diagram detailing the communications device of FIG. 1a employing the extension pick-up detection circuit, the telephone line-in-use circuit, and the remote hang-up detection circuit as an answering machine.

FIG. 1*d* is a flow diagram detailing the communications device of FIG. 1*a* employing the extension pick-up detection circuit, the telephone line-in-use circuit, and the remote hang-up detection circuit as an answering machine. The local communications device is set to await for incoming calls in a block 60. An event block 62 signifies that an incoming call has been detected.

In a block 64, the local communications device awaits an indication of call disposition. In an event block 66, the local communications device detects that the telephone communication line has been accessed via the line-in-use detection circuit, and simply returns to waiting, since the incoming call has been disposed of by answering it. An event block 67 indicates that the local communications device has rung "N" times, signifying that the local communications device should process the call. In a block 68, the local communications device goes off-hook and accesses the telephone communication line. The local communications device initiates a message for the incoming call in a block 70.

An event block 72 indicates that an extension has been picked up, as detected by the extension pick-up circuit. In a block 73, the local communications device terminates the message. The local communications device goes on-hook in a block 74. The local communications device releases the telephone communication line in a block 75 and returns to awaiting calls in the block 60.

An event block 76 indicates that the local communications device has detected a remote hang-up. In the block 73, the local communications device terminates the message. The local communications device goes on-hook in the block 74. The local communications device releases the telephone communication line in the block 75 and returns to awaiting calls in the block 60.

An event block 77 indicates that the message is complete, and the local communications device initiates recording a message in a block 78. An event block 80 indicates that the remote hang-up detection circuit has detected the other communications device hanging up. The local communications device terminates the recording in a block 81, and goes on hook in a block 74. The local communications device releases the telephone communication line in the block 75, and returns to waiting in the block 60.

An event block 84 indicates that an extension has been picked up, as detected by the extension pick-up circuit. In a block 85 the local communications device terminates the recording, and in a block 86 it deletes the recording. The local communications device then goes on hook in the block 74. The local communications device then releases the telephone communication line in the block 75, and returns to waiting in the block 60.

An event block 87 indicates that a timeout has occurred. In the block 81 the local communications device terminates the recording. The local communications device then goes on hook in the block 74, followed by releasing the telephone communication line in the block 75, and returning to waiting in the block 60.

The local communications device 10 can be a number of communications devices. For example, the local communications device 10 can be an answering machine, a facsimile machine, or a modem. The modem can be any of a number of types, including, for example, internal modems, external modems, and stand-alone modems.

Figure 2:
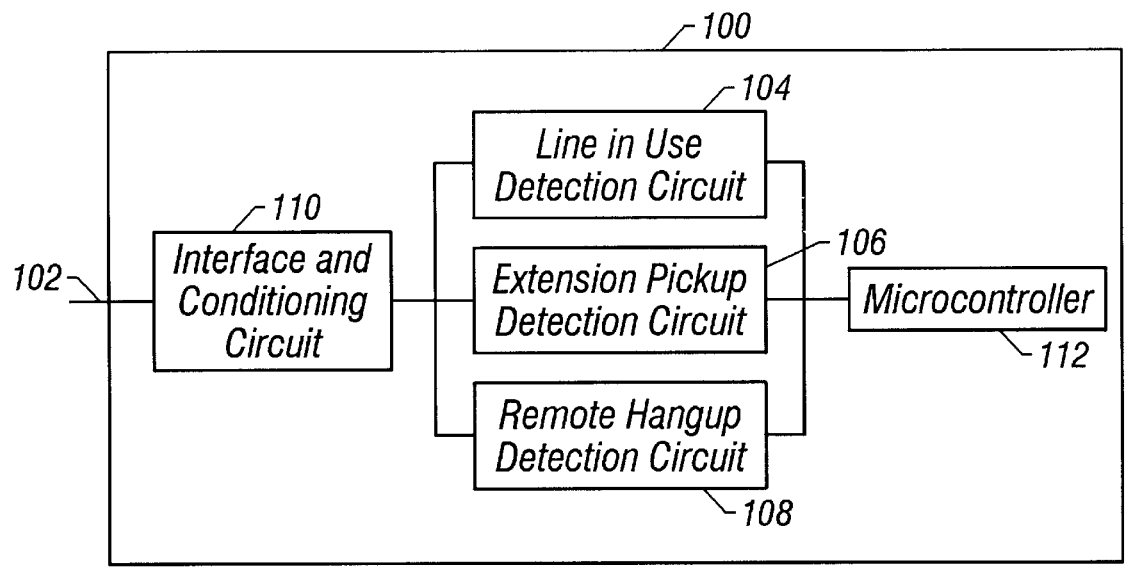
FIG. 2 is a detailed block diagram of a modem embodiment the communications device of FIG.1.

FIG. 2 is a detailed block diagram of a modem embodiment of the data communications device of FIG. 1. There, the modem 100 is connected to a telephone communication line 102, where the modem 100 includes a telephone line-in-use detection circuit 104 for detecting when another telephone extension (not shown) is already using the telephone communication line 102, an extension pick-up detection circuit 106 to detect when a telephone extension connected to the telephone communication line 102 has gone off-hook (i.e., was picked up by a person), and a remote hang-up detection circuit 108 to detect when the party on the remote end of the telephone communication line 102 connection has gone on-hook (i.e., hung-up).

The telephone communication line 102 is usually connected to a central office that supplies a line voltage and loop current over the telephone communication line 102 to each telephone extension. The modem 100 detects the events on the telephone communication line 102 by monitoring the line voltage and loop current in the telephone communication line 102. The signals entering the modem 100 from the telephone communication line 102 are first passed through an interface and conditioning circuitry 110 where a variety of functions are performed, including ensuring that a constant current is drawn from the telephone communication line 102 when the modem 100 enters the off-hook mode. The line voltage is then passed to the telephone line-in-use detection circuit 104 and remote hang-up detection circuit 108, while the telephone communication line 102 loop current is passed to the extension pick-up detection circuit 106. The outputs of each of the circuits 102, 104, and 106 are connected to respective pins on a microcontroller 112, so that an output signal is communicated to the microcontroller 112 when one of the above-described telephone communication line events is detected. The microcontroller 112 may then adjust the operation of the modem 100 accordingly.

The modem 100 utilizes the telephone line-in-use detection circuit 104 to detect when the telephone communication line 102 to which it is connected is already being used by another extension connected to the telephone communication line 102. The modem 100 will then know that the telephone communication line 102 is already in use, and the modem 100 will not attempt to enter the off-hook mode at that time. Thus, the modem 100 of the present invention will not generate signals on the telephone communication line 102 in an attempt to dial out when another extension is using the telephone communication line 102, and the persons already using the telephone communication line 102 will not be bothered by such signals, such as the annoying "popping" sounds generated by present modems when attempting to go off-hook.

Figure 3:
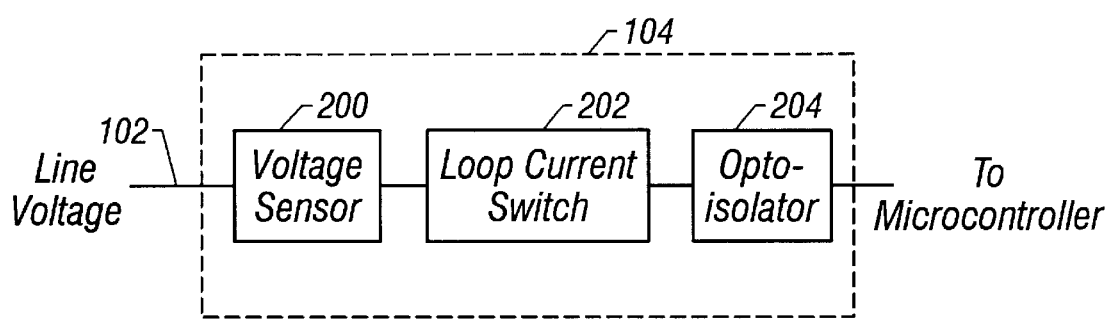
FIG. 3 is a block schematic of an exemplary modem as shown in FIG. 2.

FIG. 3 is a block schematic of an exemplary extension line in-use detection circuit of the modem as shown in FIG. 2. The line voltage from the telephone communication line 102 is fed into a voltage sensor 200. The voltage sensor 200 detects when a change in the line voltage has occurred, indicating that an extension connected to the telephone communication line 102 is off-hook (i.e., the telephone communication line is already in use). As indicated above, the central office supplies a line voltage over the telephone communication line 102 to all of the extensions of the telephone communication line 102. When an extension connected to the telephone communication line 102 goes off-hook, the line voltage supplied from the central office is dramatically decreased. For instance, it is common for the central office to supply a line voltage of approximately 48 volts during an on-hook condition while reducing the line voltage to approximately 6 volts when an off-hook condition is present.

The voltage sensor 200 is connected to a loop current switch 202, where the voltage sensor 200 produces an output activating the loop current switch 202 when the change in line voltage indicates that an extension is off-hook. When activated, loop current switch 202 allows a current to flow through an opto-isolator 204. The opto-isolator 204 provides the necessary isolation for the internal components of the modem 100 from the telephone communication line 102 in case of electrical surges, including lightning strikes. Opto-isolator 204 produces a signal indicating that the telephone communication line is in use. This may be used by the microcontroller 112, as shown in FIG. 2, to further control the operation of the modem 100. The signal indicating that the telephone communication line is in use can be used to instruct the modem 100 to not attempt to go off-hook.

Figure 4A:
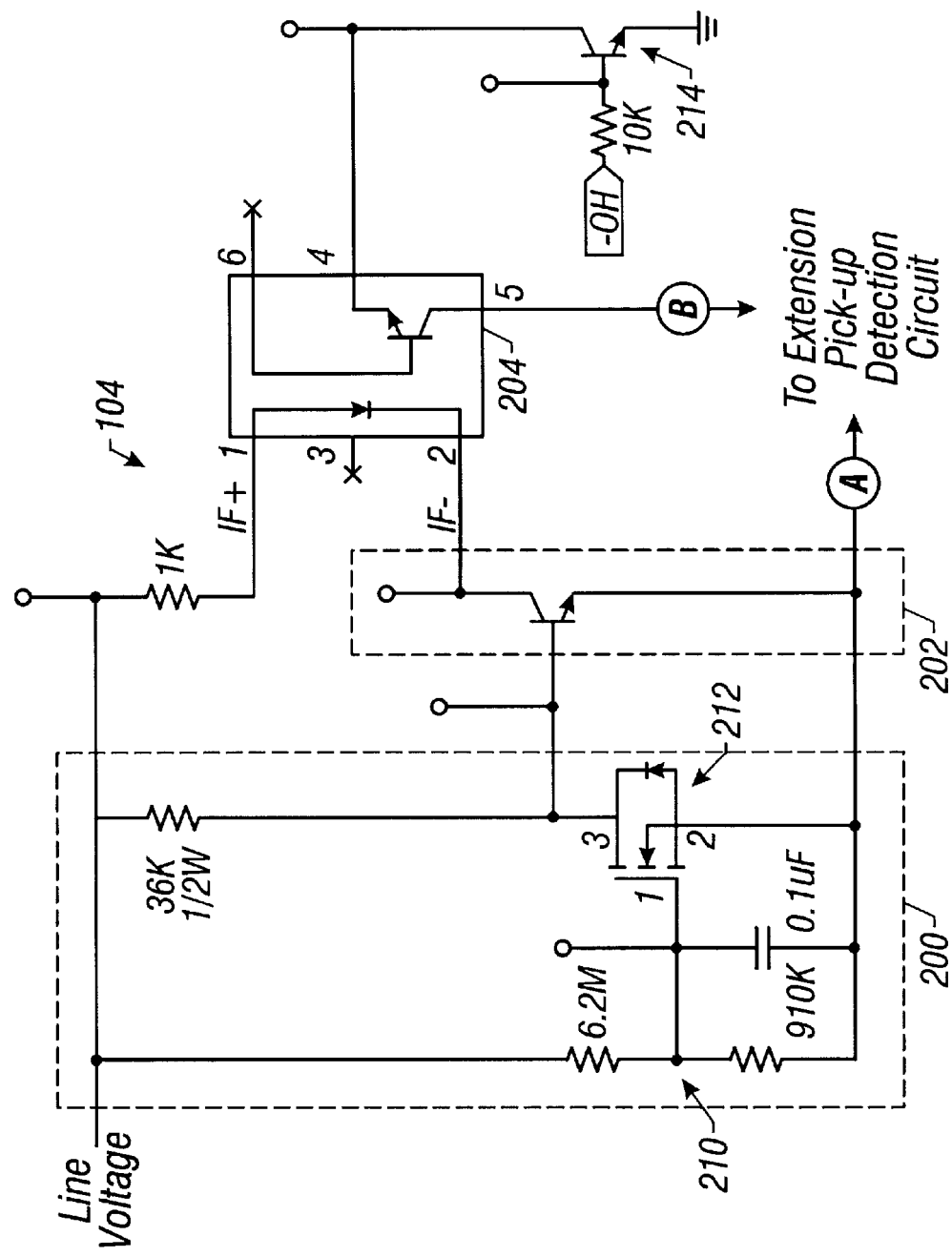
FIG. 4a is a detailed electrical schematic diagram of an exemplary embodiment of the telephone line-in-use detection circuit of FIG. 3.

FIG. 4a is a detailed electrical schematic diagram of an exemplary embodiment of the telephone line-in-use detection circuit of FIG. 3. The voltage sensor 200 includes a voltage divider 210 which feeds a voltage to the gate of a field-effect transistor (FET) 212. The FET 212 has a predetermined threshold voltage which must be applied to the gate of the FET 212 to switch current through the device. The FET 212 is normally in an on-state, allowing current to flow through the FET 212. The voltage divider 210 sets the change in line voltage which occurs when a telephone extension goes off-hook to match the gate threshold of the FET 212, so that the FET 212 is deactivated when a telephone extension connected to the telephone communication line 102 is off-hook. Once deactivated, the current is switched to flow through the loop current switch 202. Turning off the FET 212 (when an extension goes off-hook) activates the loop current switch 202, which is preferably a bipolar transistor or similar device. The loop current switch 202 gates a current through to the opto-isolator 204, where the opto-isolator 204 is activated by the current flowing to it. The opto-isolator 204 changes the level of a pin (~EXTOH) pin shown in the extension pick-up detection circuit of FIG. 6.

The telephone line-in-use detection circuit 104 is further configured to prevent the level of the pin (~EXTOH) in the microcontroller 112 from being changed when the modem 100 itself is operating in the off-hook mode. This prevents the telephone, line-in-use detection circuit 104 from falsely providing an indication that the telephone communication line 102 has experienced an extension pickup by detecting the modem 100's use of the telephone communication line 102. In order to prevent the pin (~EXTOH) from having its level changed, the opto-isolator 204 is prevented from communicating a signal through line B. A pin (~OH) from the microcontroller 112 is connected to the opto-isolator 204 through a bipolar transistor 214. When the modem 100 itself is in the off-hook mode, a deactivation signal is transmitted from the microcontroller 112 through the transistor 214 to the opto-isolator 204. By deactivating the opto-isolator 204, current is prevented from flowing through the opto-isolator 204 and, thus, no signal is output by the opto-isolator 204 to the microcontroller 112 in FIG. 2.

Figure 4B:
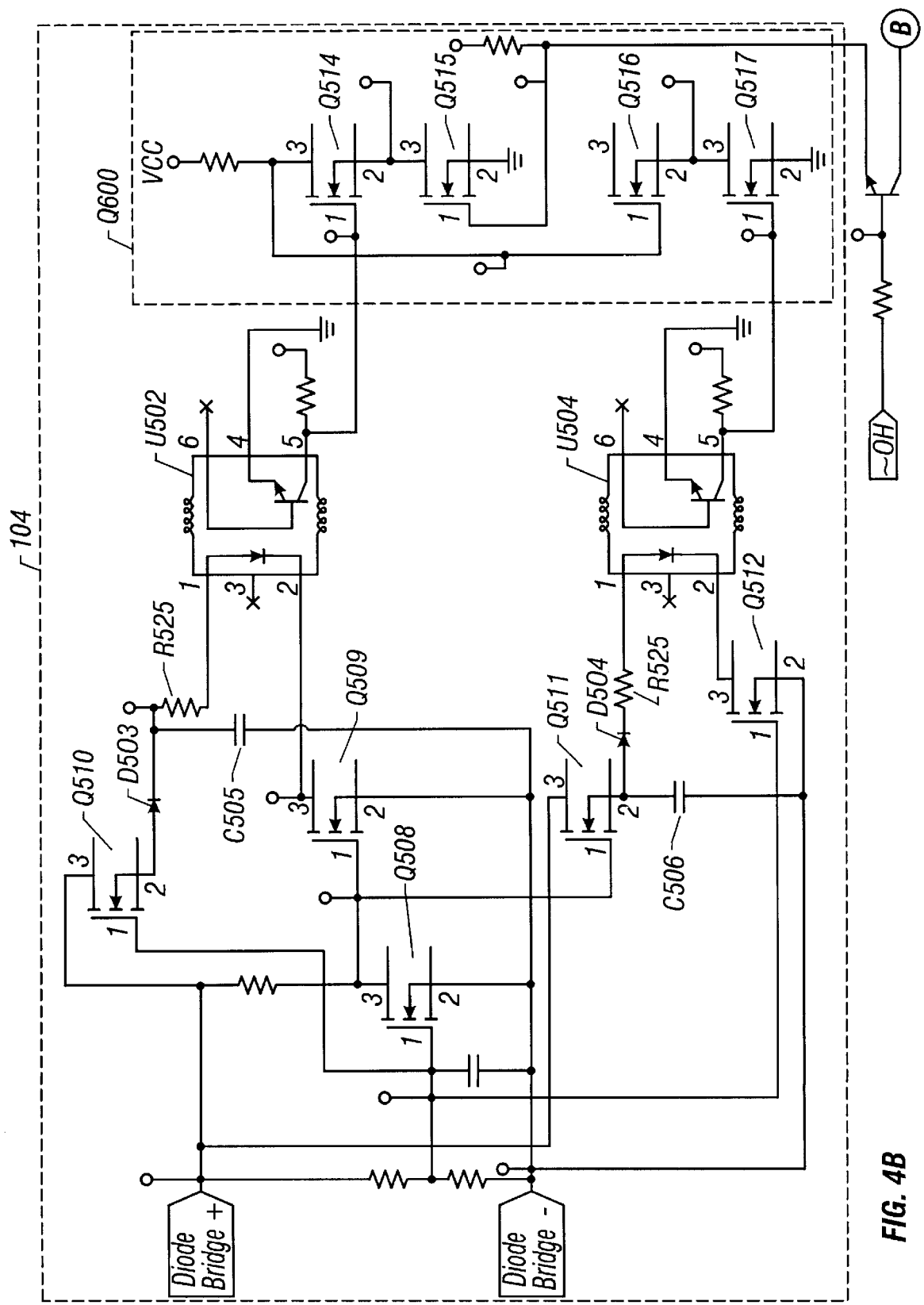
FIG. 4b is a schematic diagram of another exemplary embodiment of the line-in-use detection circuit of FIG. 3.

FIG. 4b is a schematic diagram of another exemplary embodiment of the line-in-use detection circuit of FIG. 3. When the telephone communication line is not in use, a FET Q510 is on, allowing the capacitor C505 to charge. When the telephone communication line goes from not in use to in use, the FET Q510 turns off and another FET Q509 turns on, thus allowing the capacitor C505 to discharge through resistance R525. This discharge provides a time constant. The capacitor C505 also discharges through the LED of an opto-isolator U502, thereby providing a pulse indicating that the telephone communication line is in use on the other side of the opto-isolator U502.

When the telephone communication line is in use, an FET Q511 is on, allowing a capacitor C506 to charge. When the telephone communication line goes from in use to not in use, the FET Q511 turns off, and an FET Q512 turns on, allowing the capacitor C506 to discharge through a resistance R526. This also provides a time constant. This discharge also runs through the LED of an opto-isolator U504, thereby providing a signal that the telephone communication line is no longer in use on the other side of the opto-isolator U504.

The FETs Q514, Q515, Q516, and Q517 make up an open-drain set/reset flip-flop Q600 in order to maintain low-active level line-in-use signaling, instead of just generating a pulse. The output from the opto-isolator U502, indicating that the telephone communication line is in use, feeds the low true reset input of this flip-flop arrangement. The output of the opto-isolator U504, indicating the telephone communication line is not in use, feeds the low true set input of this flip-flop arrangement. Thus, the circuit 104 continues to create a love true digital signal that is provided to the microcontroller 112 in FIG. 2.

With the widespread possible uses of a personal computer, it is now possible for the personal computer to be used as an answering machine for incoming telephone calls. The system and method of the present invention allows the modem 100 connecting the personal computer to the telephone communication line 102 to be used in an answering machine mode in a more efficient manner. When receiving voice information while operating in an answering machine mode, the modem 100 provides the flexibility of accepting an incoming telephone call by picking up a telephone extension after the modem has already begun receiving the voice information. Thus, the modem 100 stops its operation when a person picks up a telephone extension to answer an incoming call, so that the modem 100 does not interfere with the conversation transpiring over the telephone communication line 102. Therefore, the modem 100 of the present invention includes an extension pick-up detection circuit 106 to detect when a telephone extension has gone off-hook (was picked up by a per-son answering the telephone), so that the modem 100 will exit the answering machine mode and not interfere with the conversation over the telephone extension.

The extension pick-up detection circuit 106 detects when a telephone extension has gone off-hook by sensing changes in the telephone loop current from the central office. While the modem 100 is communicating with the central office through the telephone communication line 102, a noticeable change in the telephone loop current will occur when another telephone extension connected to the telephone communication line is picked up. It should be noted that the line voltage inputs into FIGS. 4a and 4b come from the output of a typical full-wave rectifying diode bridge that is always present between the tip and ring regardless of the state of the communications device.

Figure 5:
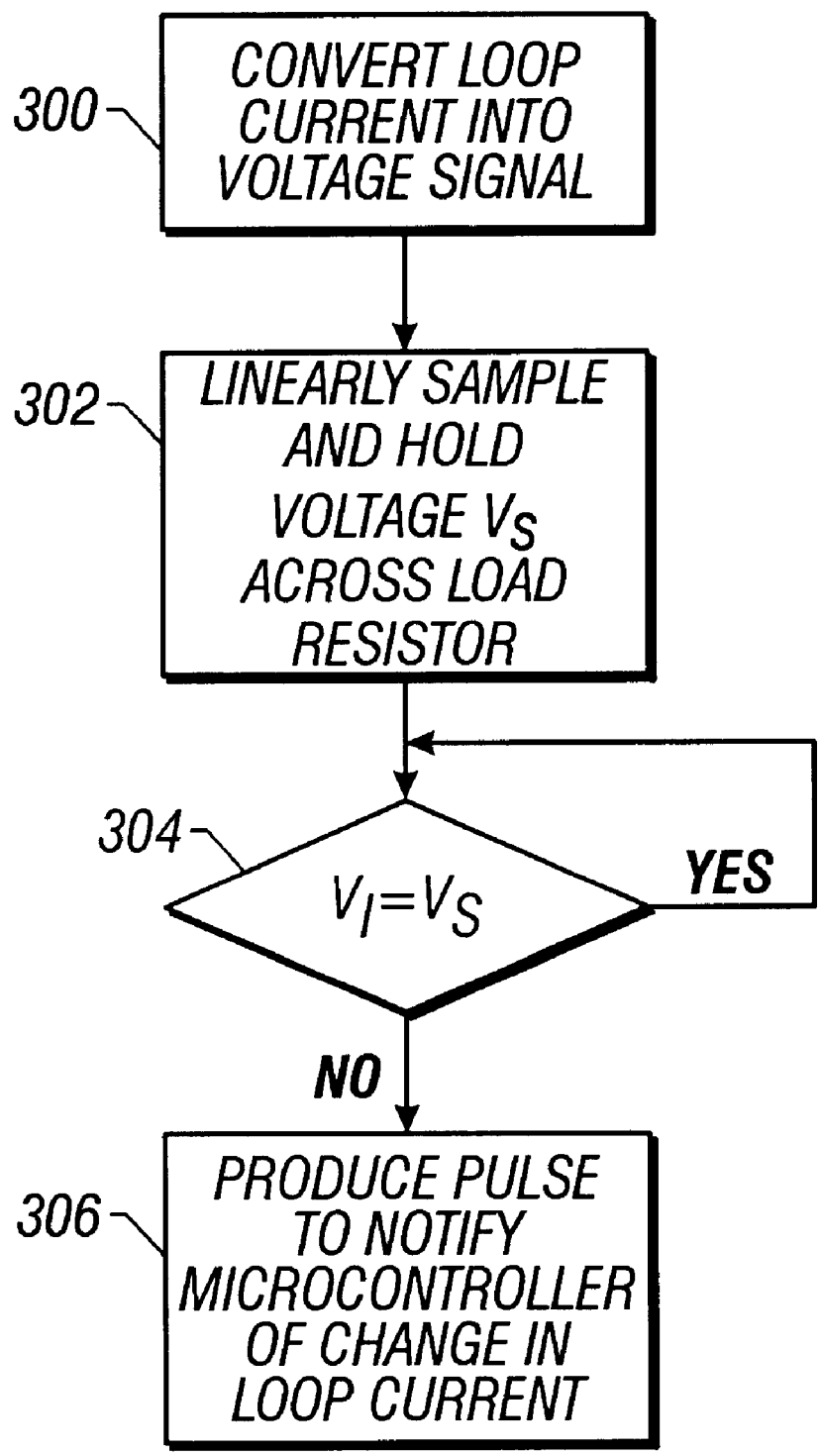
FIG. 5 is an operational block diagram illustrating an exemplary method by which the extension pick-up circuit of FIG. 3 may detect the change in telephone loop current and interact with the microcontroller of FIG. 2.

FIG. 5 is an operational block diagram illustrating an exemplary method by which the extension pick-up circuit of FIG. 3 may detect the change in telephone loop current and interact with the microcontroller of the FIG. 2. In step 300, a loop current, such as from a standard constant current source common to most modems, is converted into a voltage by passing the loop current through an opto-isolator and then through a load resistance. A voltage across the load resistance is linearly "sampled and held" ($V_S$) in step 302. The instantaneous voltage ($V_I$) appearing across the load resistance is then compared with the linearly "sampled and held" voltage ($V_S$) in step 304. If there has been a change in the loop current, then there will be a drop in the instantaneous voltage ($V_I$), thus resulting in a difference between the instantaneous voltage ($V_I$), thus resulting in a difference between the instantaneous voltage ($V_I$) and the linearly "sampled and held" voltage ($V_S$). In response to this difference between the compared voltages, an output signal is produced and communicated to the system in step 306.

This signal indicates the system of the change in loop current. This will cause the modem 100 to cease its answering machine mode of operation. If there is no difference between the instantaneous voltage ($V_I$) and the linearly "sampled and held" voltage ($V_S$), then the extension pick-up detection circuit 106 returns to step 304 where the voltage comparison is repeated. The instantaneous voltage and the "sampled and held" voltage are compared for the duration of the answering machine mode of operation.

Figure 6:
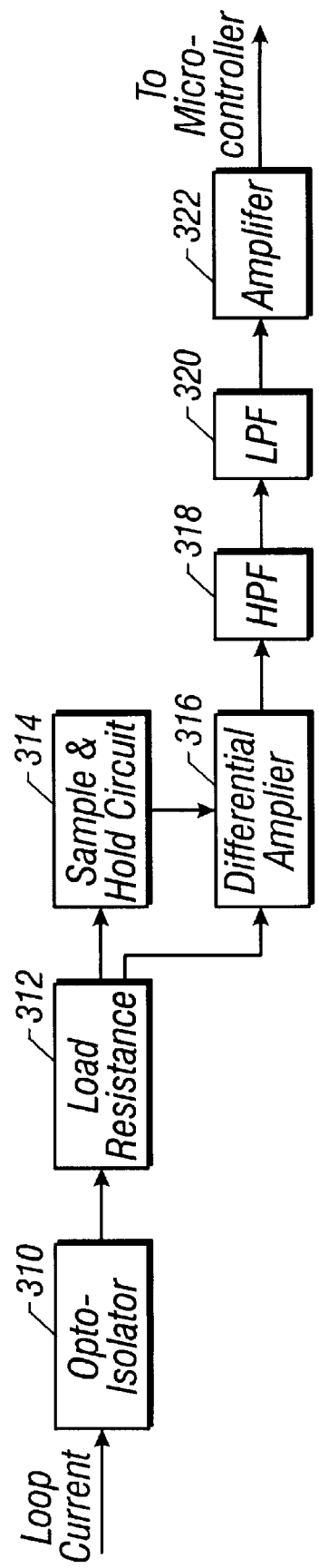
FIG. 6 is a block diagram of an exemplary embodiment of the extension pick-up detection circuit of FIG. 2.

FIG. 6 is a block diagram of an exemplary embodiment of the extension pick-up detection circuit of FIG. 2. First, the loop current from the telephone communication line 102 is directed into an opto-isolator 310. The opto-isolator 310 acts as a current to voltage amplifier with gain compression. The loop current flowing through the opto-isolator 310 is translated into a voltage across a load resistance 312

This load resistance is linearly "sampled and held" by the "sample and hold" circuit 314. The linearly sampled and held voltage has a delayed response, so that immediate changes in the voltage do not affect it.

The output of the "sample and hold" circuit 314 is connected to a differential amplifier 316, as is the load resistance 312. Thus, both the "sample and hold" voltage from the "sample and hold" circuit 314 and the instantaneous voltage are present at and compared by the differential amplifier 316. The differential amplifier 316 will produce a signal when a difference exists between the instantaneous voltage across the load resistance 312 and the "sample and hold" voltage from the "sample and hold" circuit 314.

The output of the differential amplifier 316 is passed through a high pass filter 318 to reject DC offset and common mode voltage out of the signal from the differential amplifier 316. The output of the high pass filter 318 is then passed through a low-pass filter 320 to reject any power supply noise which may cause false output pulses. The output pulse is passed from the low-pass filter 320 to an amplifier 322 which provides amplification of the current, resulting in a signal of a longer duration, where the microcontroller 112 of FIG. 2 may sense it.

Figure 7:
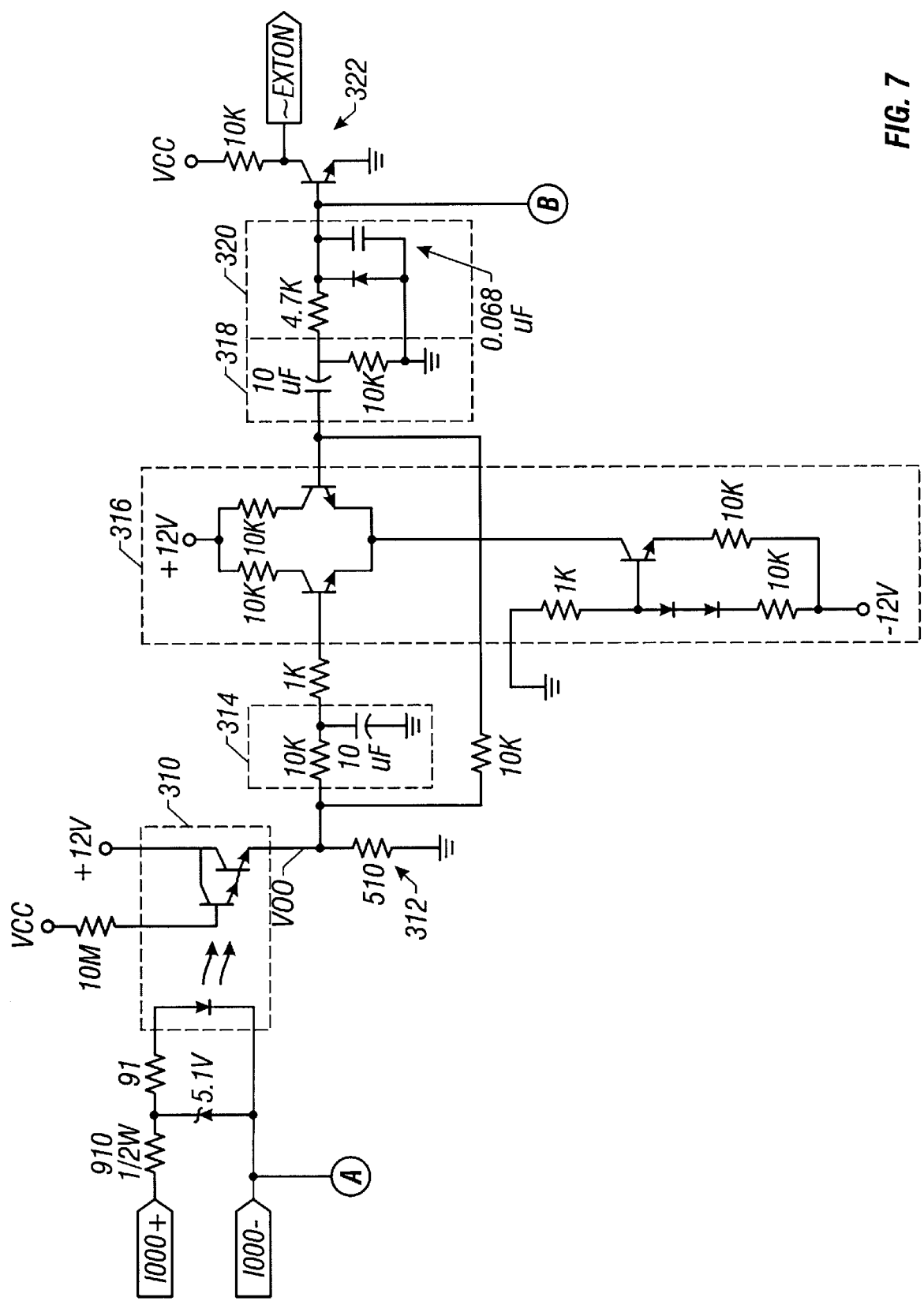
FIG. 7 is a detailed electrical schematic of an embodiment of the extension pick-up detection circuit of FIG. 6.

FIG. 7 is a detailed electrical schematic of an embodiment of the extension pick-up detection circuit of FIG. 6. As can be seen, the extension pick-up circuit 106 uses only discrete transistors to perform its voltage comparison, thus providing an extremely cost-effective manner of detecting extension pick-up by monitoring changes in the loop current through the telephone communication line 102.

Modems typically operate by communicating command signals between a transmitting modem and a receiving modem, so that the receiving modem is aware when a message from the transmitting modem is beginning and ending. However, when receiving voice information while operating in an answering machine mode, modems will not be communicating with a transmitting modem and will not receive such commands over the telephone communication line indicating that the voice message has been completed. Without such commands, the modem will not know when to end its answering machine mode and stop recording the incoming message. Thus, the modem 100 of the present invention includes a remote hang-up detection circuit 108 to detect when the party on the remote end of the connection has gone on-hook (hung-up), and the modem in the answering machine mode then knows to stop recording.

In FIG. 2, the remote hang-up detection circuit 108 monitors for changes in the loop current transmitted in the telephone communication line 102 from the central office. When the remote party hangs-up, a sudden interruption in the loop current supplied by the central office in the telephone communication line 102 will occur. The remote hang-up detection circuit 108 detects this sudden drop in loop current and informs the microcontroller 112 of this change. The microcontroller 112 then causes the modem 100 to cease operating in the answering machine mode and stop recording.

Figure 8:
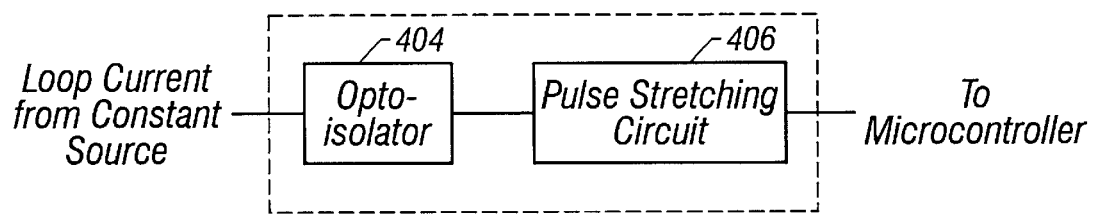
FIG. 8 is a block schematic of an exemplary remote hang-up detection circuit of FIG. 2.

FIG. 8 is a block schematic of an exemplary remote hang-up detection circuit of FIG. 2. The loop current from a constant current source, such as that found in many common modems, is fed into an opto-isolator 404. The opto-isolator 404 translates the interruption in the loop current to a pulse. The pulse is fed into a pulse-stretching circuit 406.

However, the remote hang-up detection circuit detects the remote hang-up event when the loop current is interrupted. In an exemplary embodiment of the present invention, the inputs to the remote hang-up opto-isolator 404 may be connected in parallel with the inputs of extension pickup opto-isolator 310 in FIG. 7. This reduces the number of components required to perform both remote hang-up detection and extension pickup detection. It is understood that the remote hang-up detection circuit 108 may also include its own separate current source.

The loop current from the telephone line 102, FIG. 2, is used to activate an opto-isolator 404. When the remote party goes on-hook (i.e., hangs-up), the opto-isolator 404 will detect an interruption in loop current by the central office on the telephone communication line 102. This, in turn, prevents current from flowing through the opto-isolator 404, causing the deactivation of the opto-isolator 404. The deactivated opto-isolator 404 then causes an output signal to be produced and passed through a pulse-stretching circuit 406. The pulse-stretching circuit 406 stretches the length of the output pulse signal to a level recognizable by the microcontroller 112, as shown in FIG. 2, which allows the microcontroller 112 to distinguish between a remote hang-up event and other telephone events communicated to the microcontroller 112, such as the extension pick-up event likely to be communicated to the microcontroller 112 by the extension pick-up circuit 106.

The pulse-stretched signal is then output to a respective pin on the microcontroller 112. The microcontroller 112 will then know that the a change in line voltage corresponding to a remote hang-up has occurred, and the microcontroller 112 will instruct the modem 100 to cease its answering machine mode of operation.

Figure 9:
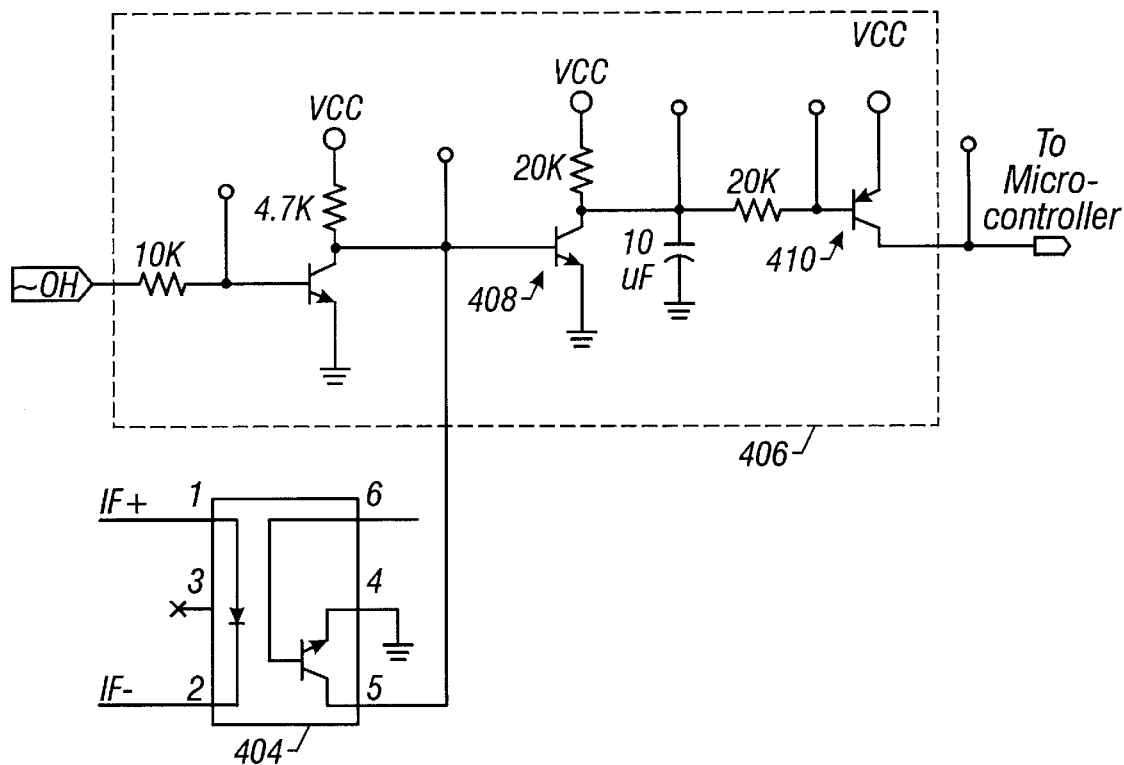
FIG. 9 is a detailed electrical schematic diagram of a possible embodiment of the remote hang-up detection circuit of FIG. 8.

FIG. 9 is a detailed electrical schematic diagram of a possible embodiment of the remote hang-up detection circuit of FIG. 8. In this embodiment, the current (IF) fed into the opto-isolator 310 of FIG. 7 of the extension pickup detection circuit, both of FIG. 7, is used to turn on the opto-isolator 404. While the opto-isolator 404 is on, it serves as a sink dissipating the current flowing through it to ground. When a remote party hangs-up, the interruption in loop current by the central office controlling the telephone communication line 102 will cause a break in the current (IF) flowing through the opto-isolator 404. The break in current (IF) deactivates the opto-isolator 404, which then allows the current which was being dissipated by the opto-isolator 404 to flow through a transistor 408 in the pulse-stretching circuit 406. This current is further used to activate a transistor 410, where the circuit components between the transistor 408 and the transistor 410 perform the pulse-stretching function. The transistor 410 then outputs the stretched pulse signal to the microcontroller 112 of FIG. 2, where the microcontroller 112 is able to distinguish this pulse signal as indicating that a remote hang-up event has occurred from an extension pick-up event by the stretched length of the pulse signal. The pulse-stretching circuit 406 is implemented using three discrete transistors, thus allowing the remote hang-up detection circuit 108 to also be formed in an inexpensive manner.

As can be seen from the foregoing, the modem formed in accordance with the present invention allows numerous telephone events to be detected by simply monitoring the line voltage and loop current transmitted through a telephone communication line using circuit arrangements of inexpensive discrete components. Moreover, by forming a modem with the detection circuitry in accordance with the present invention, telephone line-in-use, extension pick-up, and remote hang-up can be automatically detected by the modem using cost-effective circuitry. Furthermore, by implementing the detection circuitry into a modem in accordance with the present invention, the modem can effectively operate in an answering machine mode of operation.

Figure 10A:
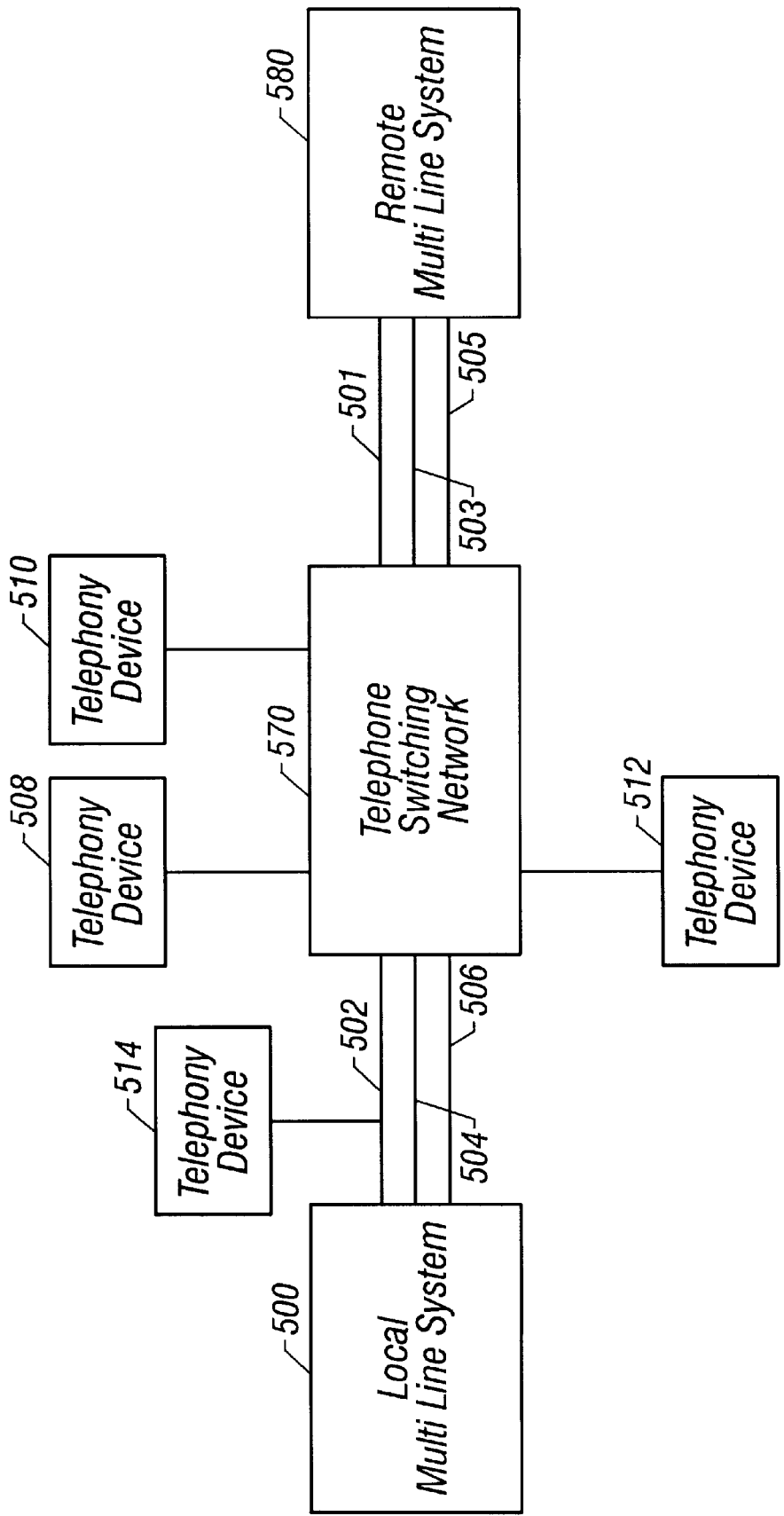
FIG. 10a is a schematic block diagram illustrating exemplary functionality of a multi-line communications system built in accordance with the present invention.

FIG. 10a is a schematic block diagram illustrating exemplary functionality of a multi-line communications system built in accordance with the present invention. In particular, a local multi-line system 500 is connected to telephone communication lines 502, 504 and 506 for communicating with any of one to three remote devices. The telephone communication lines 502, 504, and 506 are connected to a conventional telephone switching network 570. Upon request, the telephone switching network 570 selectively couples the local multi-line system 500 via the telephone communication lines 502, 504 and 506 with other devices such as telephony devices 508, 510 and 512, or a remote multi-line system 580, for example. The telephony devices 508, 510 and 512 may be any communication device using telephone communication line communication, such as a telephone, facsimile machine, modem, other multi-line device, etc.

The local multi-line system 500 uses the multiple telephone communication lines to increase the effective data bandwidth of its output. For example, should the system 500 wish to communicate with the remote multi-line host 580, it could simultaneously use all three telephone communication lines to link up with the remote host 580. The multi-line system 500 would initiate three calls through the telephone switching network 570, and establish three links to the remote multi-line system 580 via the telephone communication lines 502, 504, and 506 and corresponding telephone communication lines 501, 503, and 505. Thus, the multi-line system 500 would effectively increase its normal data output, or bandwidth. Thus, the multi-line system can arbitrate the use of the connected telephone communication lines.

Similarly, the local multi-line system 500 may wish to communicate with one or more alternate devices. With the three telephone communication lines, the local multi-line system may have one connection each to the telephony device 508, the telephony device 512, and the remote multi-line system 580. Or, it may have two telephone communication lines enabled for communication with the remote multi-line system 580, and maintain a communication link with the telephony device 510 via a single telephone communication line.

Assume, for example, all three telephone communication lines of the local multi-line system 500 are used in communication with the remote multi-line system 580. If, for some reason, a user wished to use an extension telephony device 514, the present invention would detect the extension pick up. Depending upon certain parameters, discussed below, of the link between the system 500 and the remote system 580, the multi-line system 500 would release the telephone communication line 502 for the use of the telephony device 514 for connection to some other telephony device, such as devices 508, 510, or 512. Upon completing use of the telephony device 514, the system 500 would detect that the telephone communication line 502 is no longer in use, and reconnect the telephone communication line for use in the data transfer communication with the remote host 580. It should be noted that this functionality is possible for all combinations of multi-line and single line connections. Thus, the multi-line system has an ability to drop communications upon request, and re-establish them when the use of the telephone communication line is finished.

FIG. 10a can also describe a multi-line answering machine using busy line roll-over telephone network services. A local multi-line system 500 is a multi-line answering machine serving the telephone communication lines 502, 504, and 506. If telephone communication line 502 was in use, then an incoming call would be rolled over by the switching network 570 onto an empty telephone communication line. The local multi-line system 500 could handle answering services on the telephone communication lines 502, 504, and 506, as described earlier in FIGS. 1a–1d.

Figure 10B:
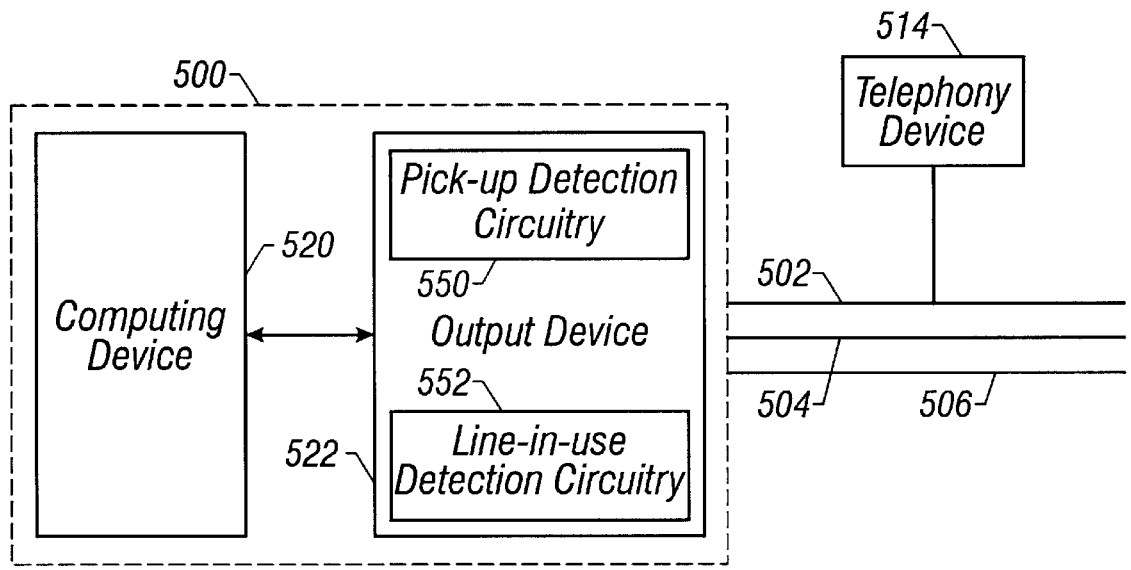

FIG. 10b is a block diagram illustrating an exemplary multi-line communication system as shown in FIG. 10a. The multi-line system 500 comprises a computing device 520 communicatively coupled to an output device 522. The output device 522 may be an integral part (e.g., on the motherboard or an internal plug-in card) of the computing device 520, or may exist as a stand-alone unit (e.g., an external modem). An example of such an output device is a multi-line modem.

Assume that all telephone communication lines are connected to a remote multi-line host for transferring data.

When the telephony device 514 is enabled to initiate some other telephonic transaction on the telephone communication line 502, the local multi-line system 500 recognizes this through a pick-up detect circuitry 550. This event is recognized by the multi-line system 500, where it can selectively respond in a number of ways. First, the multi-line system may be placed in a mode wherein external data flow to the remote multi-line host takes absolute precedence. In this case, the telephone communication line 502 will not be released.

Second, the multi-line system 500 may be placed in a mode wherein extensions are given absolute priority. The multi-line system 500 first directs the output device 522 to terminate the connection with the remote multi-line host on the telephone communications telephone communication line 502. This may be accomplished by output device gracefully terminating the connection through a handshake or other such protocol with the remote multi-line system. Alternatively, the connection may be terminated in a less graceful manner, such as simply terminating the call. The remote multi-line system may or may not then be able to tell whether the connection was terminated, but it could employ such methods as timeouts to tell. However, this is completely dependent on the remote system involved. Thus, the multi-line system 500 releases the telephone communication line 502 and allows the telephony device 514 to proceed using the telephone communication line 502 to communicate with some other telephony device.

The multi-line system 500 then reroutes all the telephonic data flow to the remote multi-line system through the other telephone communication lines 504 and 506, still connected to and in communication with the remote multi-line system. Thus, the bandwidth of the data link is selectively managed by the multi-line system 500. The use of the attached telephone communication lines 502, 504, and 506 is selectively managed and arbitrated by the multi-line system 500.

Alternatively, assume the multi-line system 500 is in contact with three different telephony devices, such as telephony devices 508, 510, and 512 in FIG. 10a, on the telephone communication lines 502, 504, and 506 respectively. When the telephony device 514 is taken off hook, assume that the multi-line system 500 releases the telephone communication line 502 for its use, thus dropping its connection to the previously connected telephony device. The multi-line system 500 could employ a priority table, and allocate the remaining telephone communication lines according to the priority of the communication. The priority could be based on the existence of communication, or the importance of communication, just for example. Should the priority of communication with the dropped telephony device exceed that for another telephony device, the multi-line system may arbitrate the use of the remaining telephone communication lines for that purpose by terminating the communication to the connected telephony device, and enabling the communication to the telephony device that was previously dropped via the associated telephone communication line. The communication to the telephony device to be dropped would then either be cancelled, or stalled until one of the telephone communication lines 502, 504, or 506 became available again.

A line-in use detect circuitry 552 would then monitor the telephone communication lines 502, 504, and 506 for the point when the associated connected telephony devices hang up. For example, assume that a telephony device releases the telephone communication line 502. This event is communicated to the multi-line system 500. The multi-line system 500 can then reassign the telephone communication line 502 to the data link between any other telephony device. Or, the multi-line system 500 may completely redirect the use of the telephone communication line 502 and establish another separate link to another telephony device.

In another case, assume that all the telephone communication lines from the multi-line system 500 are in use with another remote multi-line system. The multi-line system 500 may be placed in a mode wherein a minimum number of telephone communication lines is open to the remote system.

When the telephony device 514 is picked up, this event is communicated to the multi-line system 500. The multi-line system 500 then determines whether to release the telephone communication line 502 based upon whether a minimum number of telephone communication lines are communicatively coupled to the remote system. If the release of the telephone communication line 502 would cause the number of telephone communication lines to the remote host to fall below the minimum number, the multi-line system 500 would not release the telephone communication line 502 to the telephony device 514. However, if the release of the telephone communication line 502 would not cause the number of telephone communication lines to the remote host to fall below the minimum number, the multi-line system 500 would release the telephone communication line 502 as before. The multi-line system 500 would possibly redirect the data to the remote system through the remaining telephone communication lines, as before.

When any communications on the telephone communication lines 502, 504, or 506 are complete, the line-in-use detection circuitry 552 would communicate to the multi-line system 500 that the telephone communication line is free to use as described above.

Either the computing device 520 or the output device 500, or both, performs the arbitration of the connected telephone communication lines. This arbitration directs the flow of data through the telephone communication lines 502, 504, and 506. The arbitration of the telephone communication lines selectively adjusts the effective bandwidth of data through the system 500 to any other point connected by the telephone communication lines.

Figure 10C:
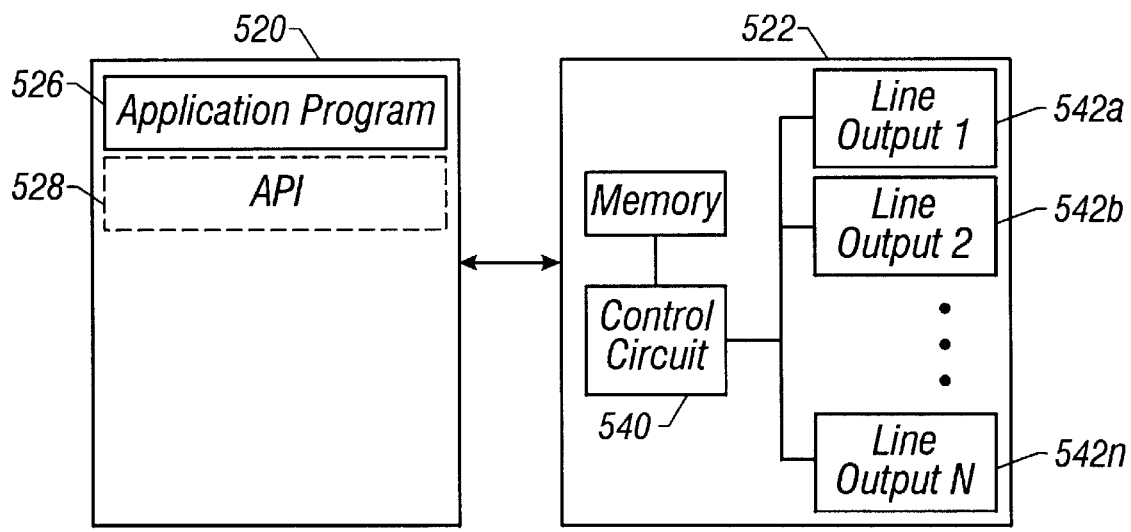
FIG. 10c is a block diagram of an exemplary embodiment of the multi-line communication system of FIG. 10b.

FIG. 10c is a block diagram of an exemplary embodiment of the multi-line communication system of FIG. 10b. FIG. 10c demonstrates several alternative methods for employing the functionality of the multi-line system as described in FIG. 10b.

The computing device 520 may run an application software 526 directly communicating to and directing the output of an output device 522. Alternatively, the computing device 520 may run an application protocol interface (API) software 528, sitting between the application software and the output device 522, and directing the output of the output device 522.

The output device 522 can comprise a control circuit 540 communicatively coupled to the telephone communication line outputs 542a–542n. The computing device 520 directs the data to be transmitted along with control commands to the control circuit 540 via the application program 526. Alternatively, the computing device 520 directs the data to be transmitted along with control commands to the control circuit 540 via the API 528. The controller then outputs the data onto the appropriate telephone communication line output. Correspondingly, the output device 522 directs data received from the telephone communication line outputs to the computing device 520 for further processing.

The arbitration of the telephone communication lines as described previously can reside, in whole or in part, in either the application program 526, the API 528, elsewhere on the computing device 522, or on the output device 522, or some combination thereof.

Figure 10D:
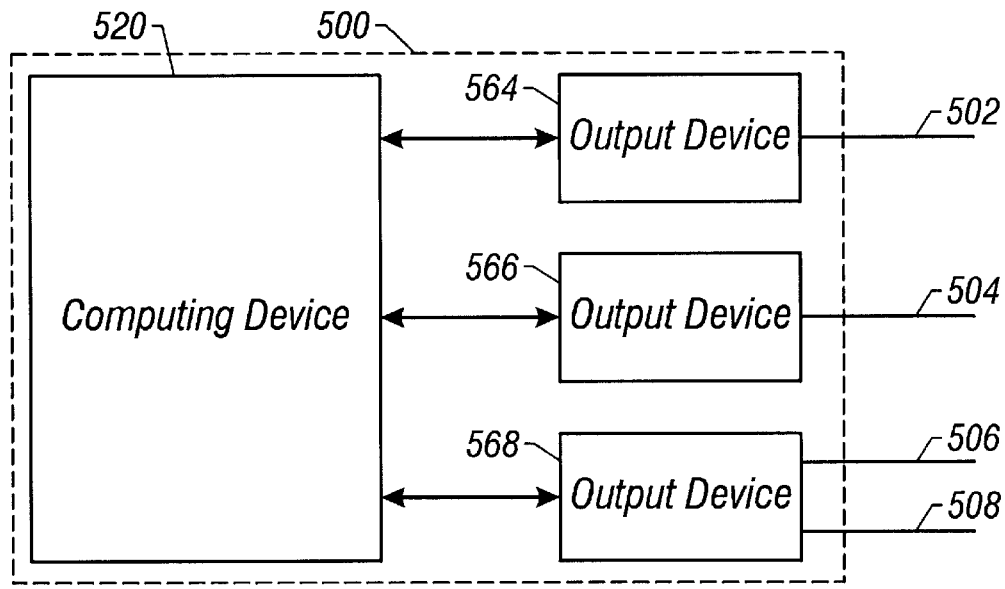
FIG. 10d is a block diagram showing an alternative embodiment of the multi-line communication system of FIG. 10b.

FIG. 10d is a block diagram showing an alternative embodiment of the multi-line communication system of FIG. 10a. There, the multi-line system 500 comprises a computing device 520 and a plurality of output devices 564, 566, and 568. As before, the arbitration of the associated telephone communication lines 502, 504, and 506 associated with the output devices 564, 566, and 568 may take many forms and exist either in the computing device 520, any of the associated output devices 564, 566, and 568, or across any combination. Additionally, the output devices 564, 566, and 568 may be single line output devices, multi-line output devices, or any combination thereof, as indicated by the output device 568 having two output telephone communication lines, 506 and 572.

Figure 11A:
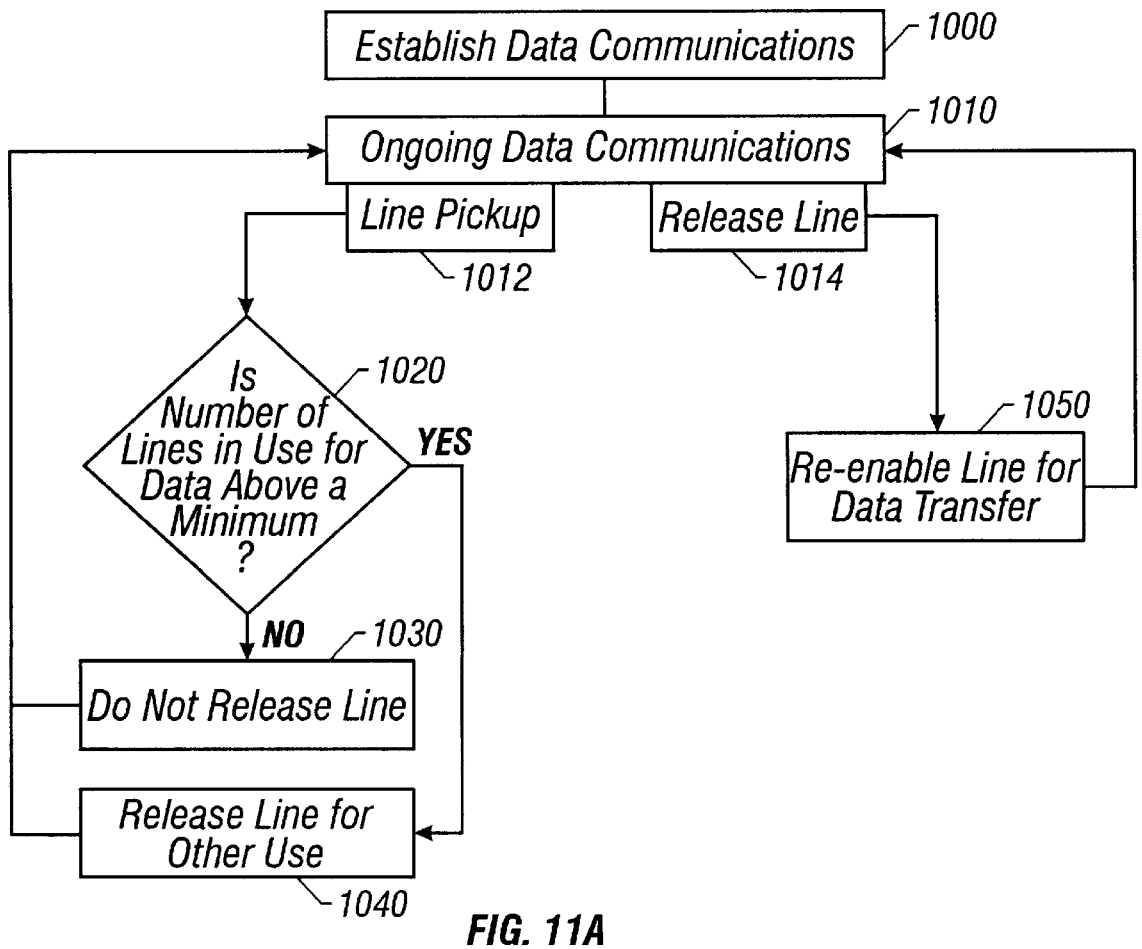
FIG. 11a is a flow chart illustrating an example of how a multi-line communication system could implement the functionality of the invention as described in FIGS. 10a–10d.

FIG. 11a is a flow chart illustrating an example of how a multi-line communication system could implement the functionality of the invention as described in FIGS. 10a–10d. In FIG. 11a, a multi-line communication system, such as the multi-line system 500 in FIG. 10a, would selectively determine the number of telephone communication lines used to communicate to a remote host and enable communications to the remote host on that number of telephone communication lines in a block 1000. In addition, a minimum number of telephone communication lines for the communication to the remote host is also determined.

If any telephone communication lines are in use by external telephony devices, the multi-line system would detect this through the in-use detect circuitry. The multi-line communication system could bypass the telephone communication lines in use for communication to the remote host. Normal communications are maintained in a block 1010.

When the multi-line communication system, such as the system 500 in FIG. 10a, detects a line pick up by an extension, such as the telephony device 514, in a block 1012, the system then determines whether it can release the telephone communication line for the extension in a block 1020.

The multi-line communication system determines whether to release the telephone communication line to the extension based on whether releasing the telephone communication line would cause the communication to the remote host to fall below the minimum number of telephone communication lines necessary. If releasing the telephone communication line causes the communication to the remote host to fall below the minimum number of telephone communication lines necessary, the multi-line system would not release the telephone communication line in a block 1030. Alternatively, if releasing the telephone communication line would not cause the communication with the remote system to fall below the minimum number of telephone communication lines necessary, the system would release the telephone communication line to the extension in a block 1040.

The system would then return to the ongoing communications mode, as depicted in the block 1010. When the system detects a telephone communication line release in the block 1014, the system would then re-enable the telephone communication line for continued data transfer between the remote system, as depicted in block 1050.

Figure 11B:
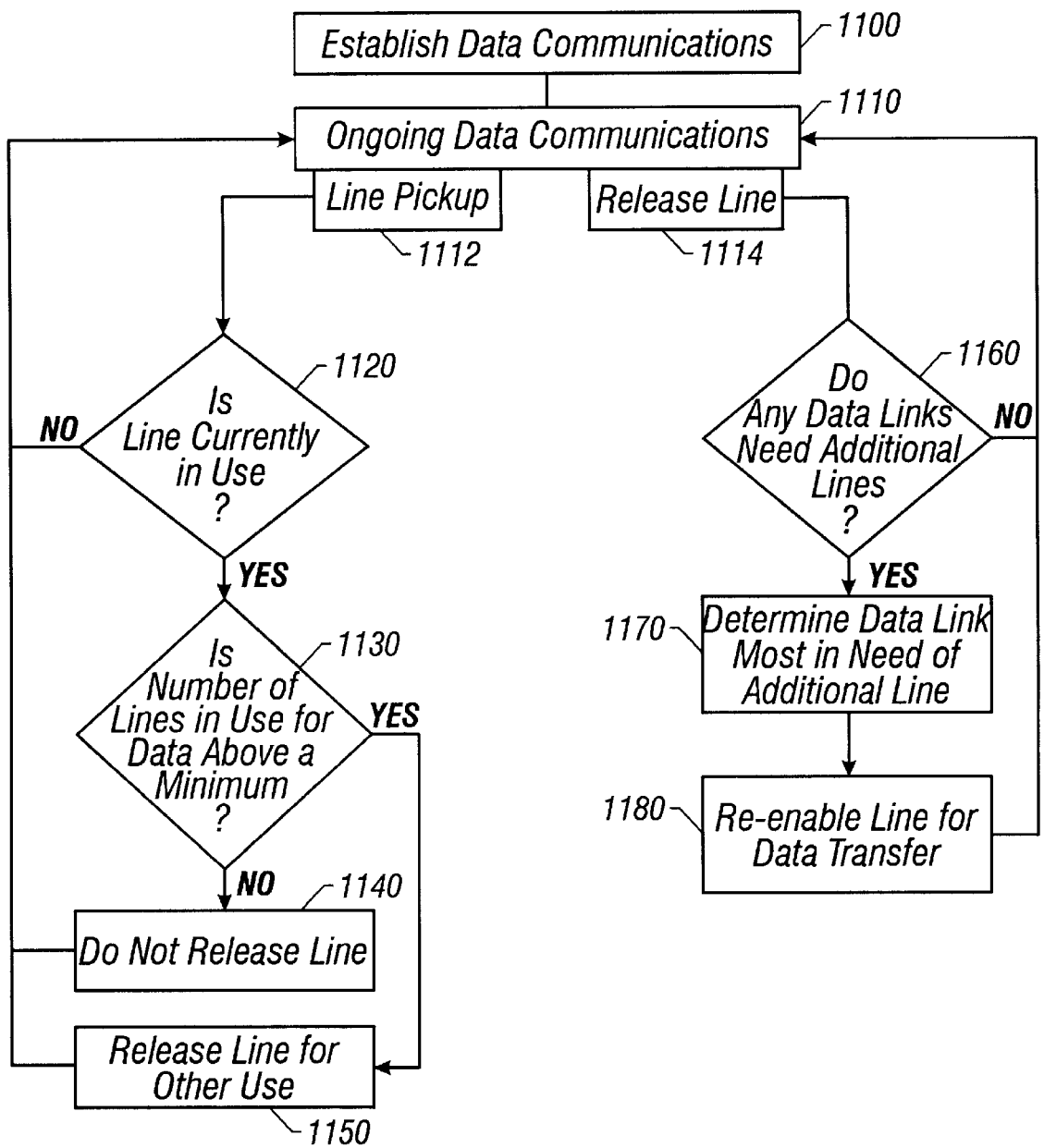
FIG. 11b is a flow chart illustrating an alternative example of how a multi-line communication system could implement the functionality of the invention as described in FIGS. 10a–10d.

FIG. 11b is a flow chart illustrating an alternative example of how a multi-line communication system could implement the functionality of the invention as described in FIGS. 10a–10d. In FIG. 11b, multi-line communication system would selectively determine the number of telephone communication lines used to communicate to a remote host and enable communications to the remote host on them in a block 1100. If any telephone communication lines are in use by external telephony devices, the in-use detect circuitry would detect this and could allow these telephone communication lines to be bypassed for the communication to the remote data terminal. Normal communications are maintained in a block 1110.

When the multi-line communication system, such as the system 500 in FIG. 10a, detects a line pick up by an extension, such as the telephony device 514, in a block 1112, the system then determines whether it should release the telephone communication line for the extension in blocks 1120 and 1130. There again, a minimum number of telephone communication lines is necessary for communication to the remote system. A determination is made whether to release the telephone communication line to the extension based on whether the release of the particular telephone communication line would cause the number of telephone communication lines to the remote system to fall below the minimum number. If the release would cause the number to fall below the minimum, the system would not release the telephone communication line in block 1140. Alternatively, if the release of the telephone communication line would not cause the number of telephone communication lines to the remote system to fall below the minimum number necessary, the system would release the telephone communication line to the extension in block 1150.

The system would then return to the ongoing communications mode, as depicted in the block 1110.

When the system detects a telephone communication line release in the block 1114, the system would then selectively re-enable the telephone communication line for continued data transfer between a remote system. This is depicted in blocks 1160 and 1170. In block 1160, the system would determine whether any data links are in need of additional telephone communication lines. If not, control resumes back at block 1110. If one or more data links are in need of additional telephone communication telephone communication lines, the system would determine the link most in need of an additional telephone communication line in block 1170. In block 1180 it would enable the telephone communication line for the data link selected in block 1170 and return control to the block 1110.

Additionally, the invention may be employed in a local network having multiple multi-line components, and may also be employed in networks having more than one communication bandwidth over the network line. This is of particular interest in the advent of networks employed in buildings using the existing telephone communication lines and bandwidth of the telephone communication lines not in the audio range.

Figure 12:
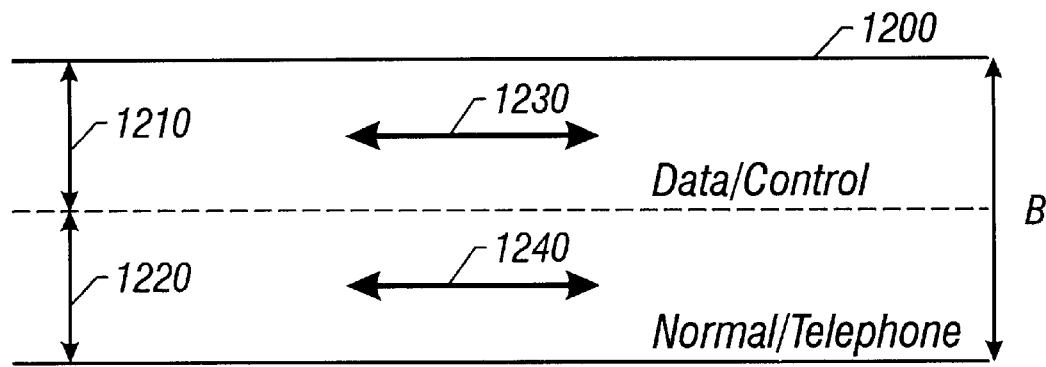
FIG. 12 is a diagram of the available bandwidth of a telephone communication line of FIG. 1, such as, for example, a standard telephone line, fiber optic communications line, T1 line, T3 line, a coaxial cable line, or any of the varieties of digital subscriber lines with the data and control messages sent on a separate bandwidth from that of normal audio communications.

FIG. 12 is a diagram of the available bandwidth of a telephone communication line of FIG. 1, such as, for example, a standard telephone line, fiber optic communications line, T1 line, T3 line, a coaxial cable line, or any of the varieties of digital subscriber lines with the data and control messages sent on a separate bandwidth from that of normal audio communications. Each communication channel 1200 has an available bandwidth B. Multiple communication access may be accomplished on the communication channel 1200 by allocating portions of the available bandwidth B for data communication and for normal audio communications. Within the bandwidth B, a data bandwidth 1210 and an audio bandwidth 1220 are allocated, thereby allowing the transmission of multiple types of communication, exemplified by data flow arrows 1230 and 1240. Thus, any two or more telephony devices may communicate with each other by employing modulation techniques, which utilize a set bandwidth on the telephone communication line.

Figure 13:
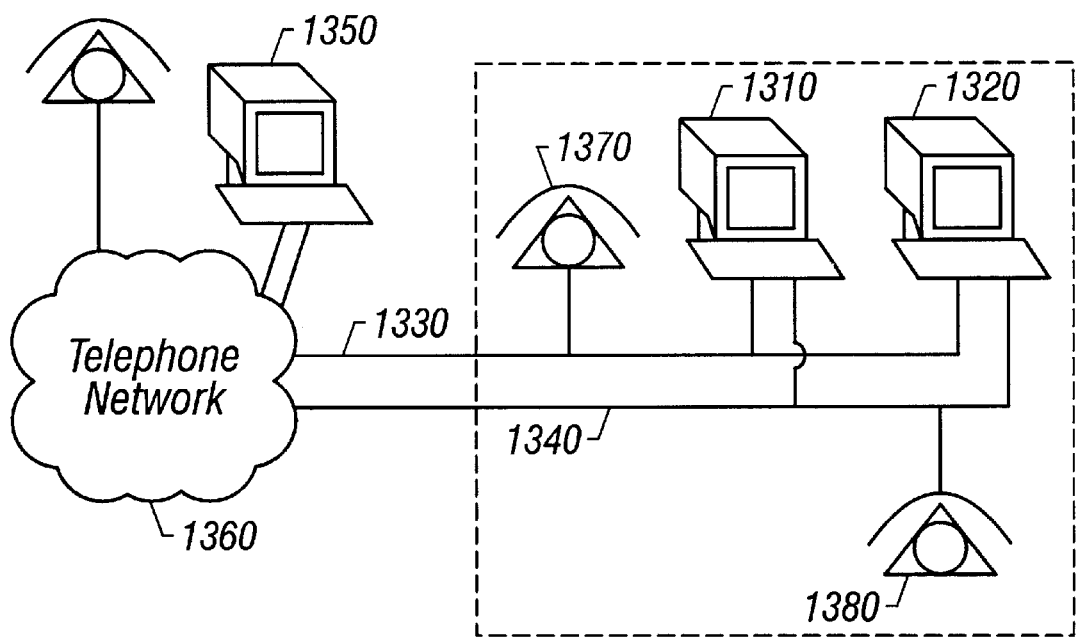
FIG. 13 is a block representation of multiple multi-line communication devices employing the data communications device of FIG. 1 and using a multiple bandwidth communications line.

FIG. 13 is a block representation of multiple multi-line communication devices employing the data communications device of FIG. 1 and using a multiple bandwidth communications line. Telephony devices 1310 and 1320 employ multi-line communication devices, such as the multi-line communication device of FIG. 1. The telephony devices 1310 and 1320 are connected to the telephone communication lines 1330 and 1340. The telephony devices can be, for example, computers, printers, scanners, telephones, or any other device using the telephone communication lines 1330 and 1340 to transmit data. The telephone communication lines can be, for example, standard telephone lines, T1 lines, T3 lines, fiber optic lines, or coaxial lines. The telephony devices can communicate on the telephone communication lines 1330 and 1340 with each other or other remote telephony devices by employing modulation techniques to transfer data over the telephone communication lines 1330 and 1340.

The telephony devices 1310 and 1320 employ the telephone communication lines 1330 and 1340 to communicate between themselves, or to other telephony devices, such as a remote data device 1350, through a standard telephone switching network 1360. Additionally, the local telephony devices 1370 and 1380 are connected to the telephone communication lines 1330 and 1340, respectively.

The telephony devices 1310 and 1320 can communicate among themselves using a bandwidth on the telephone communication lines 1330 and 1340 at a bandwidth other than that used for normal audio telephony communications. Assume, for example, that the telephony device 1310 is communicating with the remote data device 1350 via telephone communication line 1330. The communication with the remote data device 1350 is in the standard audio modem mode, that is, in the audio portion of the bandwidth of the telephone communication line 1330.

When a user takes telephony device 1370 off-hook, the telephony device 1310 sends a message to the other telephony device 1320 via either telephone communication line 1330 or telephone communication line 1340 using the portion of the bandwidth not in the audio bandwidth. This message indicates that the telephony device 1310 is giving up the telephone communication line 1330, and is requesting the use of another telephone communication line to resume its connection to the data device 1350.

The telephony device 1320 may respond to this request in a number of ways. The telephony device 1320 may respond by indicating that it is using the other telephone communication line 1340 itself and will not give it up. Or, the telephony device 1320 may respond by indicating that it is using the telephone communication line 1340 itself and will give it up. Or, the telephony device 1320 may respond by indicating that it is not using the telephone communication line 1340 at all. Or, the two telephony devices may employ some form of telephone communication line arbitration, discussed above, to determine the use of the telephone communication lines 1330 and 1340.

Likewise, when the telephony device 1370 stops using the telephone communication line 1330, either or both of the telephony devices 1320 and 1310 may detect this event, and inquire the other telephony device as to the usage of the telephone communication line 1330. Likewise, the arbitration schemes described above may be employed to govern the assignment of the free telephone communication lines.

Additionally, either the telephony device 1320 or the telephony device 1310 may act as the arbitration device. The arbitration device would prioritize the data traffic flowing through the telephone network 1360 on the telephone communication lines 1330 and 1340. Thus, the use of the telephone communication lines 1330 and 1340 would be governed by such requests to the arbitrating device. In addition, any conflicts as to the use of the telephone communication lines, such as presented above, would be governed by the arbitration device. Additionally, the arbitration device could be employed to assign the minimum and maximum numbers of telephone communication lines needed for a particular telephony device's communication. As such, the methods as described in FIGS. 11a and 11b would be employed on an enterprise scale.

In each of the above embodiments, the different systems for detecting telephone line-in-use, extension pick-up, and remote hang-up by the detection circuitry of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described exemplary embodiments can be configured without departing from the scope and spirit of the invention. Therefore, it is to be understood that, within the scope of the appended claims, the invention may be practiced other than as specifically described herein.

We claim:

1. A data exchange system for transferring data to or from one or more remote telephony devices over a switched telephone network via a plurality of telephone communication lines, the one or more remote telephony devices communicatively coupled to the data exchange system through the plurality of telephone communication lines, the data exchange system comprising:

a plurality of local telephony devices, the plurality of local telephony devices comprising one or more interfaces connectable to receive signals from corresponding one or more telephone communication lines, the at least one of the plurality of telephone communication lines having a plurality of bandwidths for the exchange of information, the at least one of the plurality of local telephony devices exchanging data with another telephony device at a first bandwidth on the at least one of the plurality of telephone communication lines; and at least one of the plurality of local telephony devices communicating information regarding usage of the plurality of telephone communication lines at a second bandwidth to another local telephony device.

2. The data exchange system of claim 1 wherein at least one of the plurality of local telephony devices has a data communication device comprising an extension pick up detection circuit.

3. The data exchange system of claim 1 wherein at least one of the plurality of local telephony devices has a data communication device comprising a line-in-use detection circuit.

4. The data exchange system of claim 1 wherein at least one of the plurality of local telephony devices has a data communication device comprising a remote hang-up detection circuit.

5. The data exchange system of claim 1 wherein at least one of the plurality of local telephony devices communicates information on the use of at least one of the plurality of telephone communication lines to another local telephony device in response to an action of a telephony device communicatively coupled to at least one of the plurality of telephone communication lines communicatively coupled to the at least one of the plurality of local telephony devices.

6. A data exchange system for transferring data among a plurality of local telephony devices communicatively coupled by a plurality of telephone communication lines, the plurality of local telephony devices capable of transferring data to one or more remote telephony devices over a telephone network, the data exchange system comprising:

- a plurality of local telephony devices, the plurality of local telephony devices comprising one or more interfaces connectable to receive signals from a corresponding one or more telephone communication lines, the plurality of telephone communication lines able to transfer data at a plurality of bandwidths,
- at least one of the plurality of local telephony devices exchanging data with the one or more remote telephony devices under a modulation within a first bandwidth on the at least one of the plurality of telephone communication lines; and
- at least one of the plurality of local telephony devices communicating information regarding usage of the plurality of telephone communication lines to other local telephony devices at a second bandwidth, allowing coordinated management of usage of the telephone communication lines among the plurality of local telephony devices.

7. The data exchange system of claim 6 wherein at least one of the plurality of local telephony devices has a data communication device comprising an extension pick up detection circuit.

8. The data exchange system of claim 6 wherein at least one of the plurality of local telephony devices has a data communication device comprising a remote hang-up detection circuit.

9. The data exchange system of claim 6 wherein at least one of the plurality of local telephony devices has a data communication device comprising a line-in-use detection circuit.

10. The data exchange system of claim 6 wherein at least one of the plurality of local telephony devices communicates information regarding the use of at least one of the plurality of telephone communication lines in response to an action of a telephony device on at least one of the plurality of telephone communication lines coupled to the at least one of the plurality of local telephony devices.

* * * * *